(12) United States Patent  
Izume et al.

(10) Patent No.: US 12,179,704 B2  
(45) Date of Patent: Dec. 31, 2024

(54) LID DEVICE AND CENTER CONSOLE BOX

(71) Applicant: NIFCO INC., Yokosuka (JP)

(72) Inventors: Tomoharu Izume, Yokosuka (JP); Atsushi Doi, Yokosuka (JP)

(73) Assignee: NIFCO INC., Yokosuka (JP)

( * ) Notice: Subject to any disclaimer, the term of this patent is extended or adjusted under 35 U.S.C. 154(b) by 301 days.

(21) Appl. No.: 17/783,471

(22) PCT Filed: Feb. 2, 2021

(86) PCT No.: PCT/JP2021/003711  
§ 371 (c)(1),  
(2) Date: Jun. 8, 2022

(87) PCT Pub. No.: WO2021/157564  
PCT Pub. Date: Aug. 12, 2021

(65) Prior Publication Data  
US 2023/0014176 A1    Jan. 19, 2023

(30) Foreign Application Priority Data

Feb. 4, 2020   (JP) .................................. 2020-017343

(51) Int. Cl.  
*B60R 7/04*   (2006.01)  
*E05C 19/02*   (2006.01)

(52) U.S. Cl.  
CPC ............... *B60R 7/04* (2013.01); *E05C 19/02* (2013.01)

(58) Field of Classification Search  
CPC .. B60R 7/04; B60R 7/043; B60R 7/06; E05B 83/32; E05C 19/02

(Continued)

(56) References Cited

U.S. PATENT DOCUMENTS

| 5,067,625 A | 11/1991 | Numata |
| 5,357,652 A | 10/1994 | Yamada |

(Continued)

FOREIGN PATENT DOCUMENTS

| DE | 102004025655 B3 * | 10/2005 | ............... B60R 7/04 |
| JP | H05-338496 A | 12/1993 | |

(Continued)

OTHER PUBLICATIONS

English translation of JP H07-9914 (applicant cited); rretrieved May 28, 2024 via PatentTranslate located at www.epo.org. (Year: 2024).*

(Continued)

*Primary Examiner* — Jason S Daniels  
(74) *Attorney, Agent, or Firm* — HAUPTMAN HAM, LLP

(57) ABSTRACT

The lid device includes a latch body for a latch receiver provided in an opening forming body, an urging device that urges the latch body to always be in a position of being engaged with the latch receiver, and a switching member that is movably provided on a lid lower and that disengages the latch body and the latch receiver in a forward portion. A lid upper is combined with the lid lower so as to be able to slidably move in a direction orthogonal to the axial direction of the rotation center axis of the lid cover. Also provided is a linking member that links the lid upper and the lid lower so that the switching member is moved to the forward position when the lid upper is movably operated toward the rotation center axis of the lid lower.

5 Claims, 12 Drawing Sheets

(58) Field of Classification Search
USPC .......................................... 296/24.34, 24.46
See application file for complete search history.

(56) References Cited

U.S. PATENT DOCUMENTS

| | | | |
|---|---|---|---|
| 9,140,044 B2* | 9/2015 | Singh | E05D 15/502 |
| 10,526,830 B2* | 1/2020 | Ike | E05D 15/502 |
| 2018/0022281 A1 | 1/2018 | Hatakeyama | |

FOREIGN PATENT DOCUMENTS

| | | |
|---|---|---|
| JP | H07-9914 A | 1/1995 |
| JP | 2789223 B2 | 8/1998 |
| JP | 4323143 B2 | 9/2009 |
| JP | 4772541 B2 | 9/2011 |
| JP | 5280269 B2 | 9/2013 |

OTHER PUBLICATIONS

European Patent Office, "Extended European Search Report with Search Opinion for European Application No. 21751411.6," Mar. 7, 2024.

PCT/ISA/210, "International Search Report for PCT International Application No. PCT/JP2021/003711," Apr. 20, 2021.

* cited by examiner

LID DEVICE AND CENTER CONSOLE BOX

TECHNICAL FIELD

The present invention relates to an improvement of a lid device and a center console box that uses same.

BACKGROUND ART

A lid device, where a lid main unit in a state that an opening of an opening forming body is closed is released by pressing of a button part provided on a side part of the lid main unit, and the lid main unit is opened with a side on which the button is pressed as a free end, is disclosed in Patent Document 1.

DOCUMENTS OF THE PRIOR ART

Patent Documents

Patent Document 1: Japanese Patent No. 4772541

SUMMARY OF THE INVENTION

Problem to be Solved by the Invention

With the lid device of Patent Document 1, when opening the lid main unit, the button unit must be confirmed visually before pressing. In a case where the lid device is, for example, a lid of a center console box of a vehicle, it is difficult to visually confirm and then press the button part, as described above, while driving. It would also not be easy to operate the button part from a rear seat side.

The main object to be solved by the present invention is to provide, in a logical manner for this type of lid device, a structure that makes opening the lid device easy and intuitive while giving the lid device a high-quality appearance.

Means for Solving the Problem

To resolve the problem, the present invention, in a first aspect, is a lid device that includes a main part formed of two lid forming bodies, wherein
  one of the two lid forming bodies is axially supported by an opening forming body where an opening is closed by the lid device, and includes:
  a latch body for a latch receiver provided on the opening forming body;
  a biasing means that biases so that a latch end of the latch body is always in a position to engage the latch receiver; and
  a switching member that is movably provided on the other of the two lid forming bodies, and in a forward position, pushes the latch body in a direction that opposes the bias, and thus disengages the engagement between the latch body and the latch receiver, wherein
  the other of the two lid forming bodies is slidably and movably combined to the one of the two lid forming bodies, and includes:
  a linking member that links the two lid forming bodies, wherein
  when the other of the two lid forming bodies is slid and moved, the switching member is moved to the forward position.

According to this configuration, first, the opening of the opening forming body can be held closed by the main part of the lid device by engaging the latch body with the latch receiver of the opening forming body. Second, sliding and moving the other of the two lid forming bodies, from the state where the opening of the opening forming body is closed in this way, disengage the engagement of the latch body, and allows the main part to be rotated in a direction that opens the opening of the opening forming body. The other of the two lid forming bodies can be operated intuitively to achieve this opening operation. Third, reactivating the main part, from the state where the opening of the opening forming body is opened, allows the recreation of the state where the opening of the opening forming body is closed by the main part, and this state to be held by reengaging the latch body with the latch receiver.

To resolve the problem, the present invention, in a second aspect, is a lid device that includes a lower lid; and
  an upper lid arranged on the lower lid, wherein
  the lower lid is axially supported by an opening forming body where an opening is closed by the lid device, and includes:
  a latch body for a latch receiver provided on the opening forming body;
  a biasing means that biases so that a latch end of the latch body is always in a position to engage the latch receiver; and
  a switching member that is movably provided on the lower lid, and that, in a forward position, pushes the latch body in a direction that opposes the bias, and thus disengages the engagement between the latch body and the latch receiver, wherein
  the upper lid is combined with the lower lid so as to be able to slide and move in a direction orthogonal to an axial direction of a rotating center shaft of the lower lid, and includes:
  a linking member that links the upper lid and the lower lid, wherein
  when the upper lid is moved toward the rotating center shaft side of the lower lid, the switching member is moved to the forward position.

According to this configuration, first, engaging the latch body of the lower lid with the latch receiver of the opening forming body allows the state where the opening of the opening forming body is closed to be held by the lower lid and the upper lid (hereinafter also abbreviated as a main part of the lid device) combined therewith. Second, moving the upper lid toward a rotating center shaft side of the lower lid, from the state where the opening of the opening forming body is closed in this way, disengages the engagement of the latch body, and allows the main part to be rotated in a direction that opens the opening of the opening forming body with the rotating center shaft as a center. Since the main part opens with a movement destination side of the upper lid as a center of rotation from a side opposite this center of rotation, the upper lid can be operated intuitively to achieve this opening operation. Third, reactivating the main part, from the state where the opening of the opening forming body is opened, allows the recreation of the state where the opening of the opening forming body is closed by the main part, and this state to be held by reengaging the latch body with the latch receiver.

To resolve the problem, the present invention, in a third aspect, is a lid device that includes a lower lid that includes a linking body; and
  an upper lid arranged on the lower lid, wherein,
  the linking body of the lower lid is axially supported on one end by an opening forming body where an opening is closed by the lid device through a first shaft and is axially supported on the other end by the lower lid through a second shaft parallel to the first shaft, and in addition, includes a latch body for a latch receiver provided on the opening forming body and a biasing means that biases so that a latch end of the latch body is always in a position to engage the latch receiver, and the lower lid includes: an engaging end that fits into an engaging hole formed in the linking body between both ends of the linking body; and a switching member provided movably so as to be able to position the engaging end in a forward position where the engaging end fits furthest into the linking body through the engaging hole, a retracted position where the engaging end is pulled out from the engaging hole, or an intermediate position where the engaging end is between the forward and retracted positions, respectively, wherein when the engaging end of the switching member is in the forward position, the latch body is pushed by the engaging end in a direction opposing the bias, which thus disengages the engagement of the latch body with the latch receiver, and the upper lid is combined with the lower lid so as to be able to slide and move in a direction orthogonal to an axial direction of the first shaft and the second shaft, and the upper lid includes:

a linking member that links the upper lid and the lower lid, wherein when the upper lid is in a position before moving, the switching member is positioned in the intermediate position, when the upper lid is moved to the first shaft side, the switching member is moved toward the forward position, and when the upper lid is moved toward the second shaft side, the switching member is moved toward the retracted position.

In this case, since, in addition to the functions of the lid device according to the second aspect, the first shaft of the linking body is on the one end side thereof and the second shaft of the linking body is on the other end side thereof, when the upper lid is moved toward a first shaft side, the main part can be opened with the first shaft as a center of rotation, and the side on which the second shaft is positioned as a free end. Meanwhile, when the upper lid is moved toward a second shaft side, the main part can be opened with the second shaft as the center of rotation and the side on which the first shaft is positioned as the free end.

An embodiment of the present invention provides an upper lid biasing means that reactively biases the upper lid toward the position before moving in the lid device.

Furthermore, to resolve the problem, the present invention, from a fourth aspect, forms a center console box with the lower lid combined with the upper lid in any of the lid devices described above as a lid and an opening forming body as a box, the center console box being arranged so that a rotating center shaft of the lower lid follows a lengthwise or widthwise direction of a vehicle.

Moreover, to resolve the problem, the present invention, from a fifth aspect, is a center console box made up of a box forming body and a lid device that is axially supported by the box forming body, and that is held in a state where an opening of the box forming body is closed by a latch mechanism, and a state in which the lid device is held in the latch mechanism is released by movement with respect to the lid device.

Effect of the Invention

Since the present invention makes an operation for opening this type of lid device possible by sliding and moving the lid device, such an opening operation can be performed easily and intuitively.

In particular, since the upper lid forms an upper part of the main part and is not a separately attached button body, it is possible to provide, in a logical manner for the lid device, a function that performs an opening operation both easily and intuitively while giving the lid device a high-quality appearance.

DESCRIPTION OF THE PREFERRED EMBODIMENTS

Figure 1:
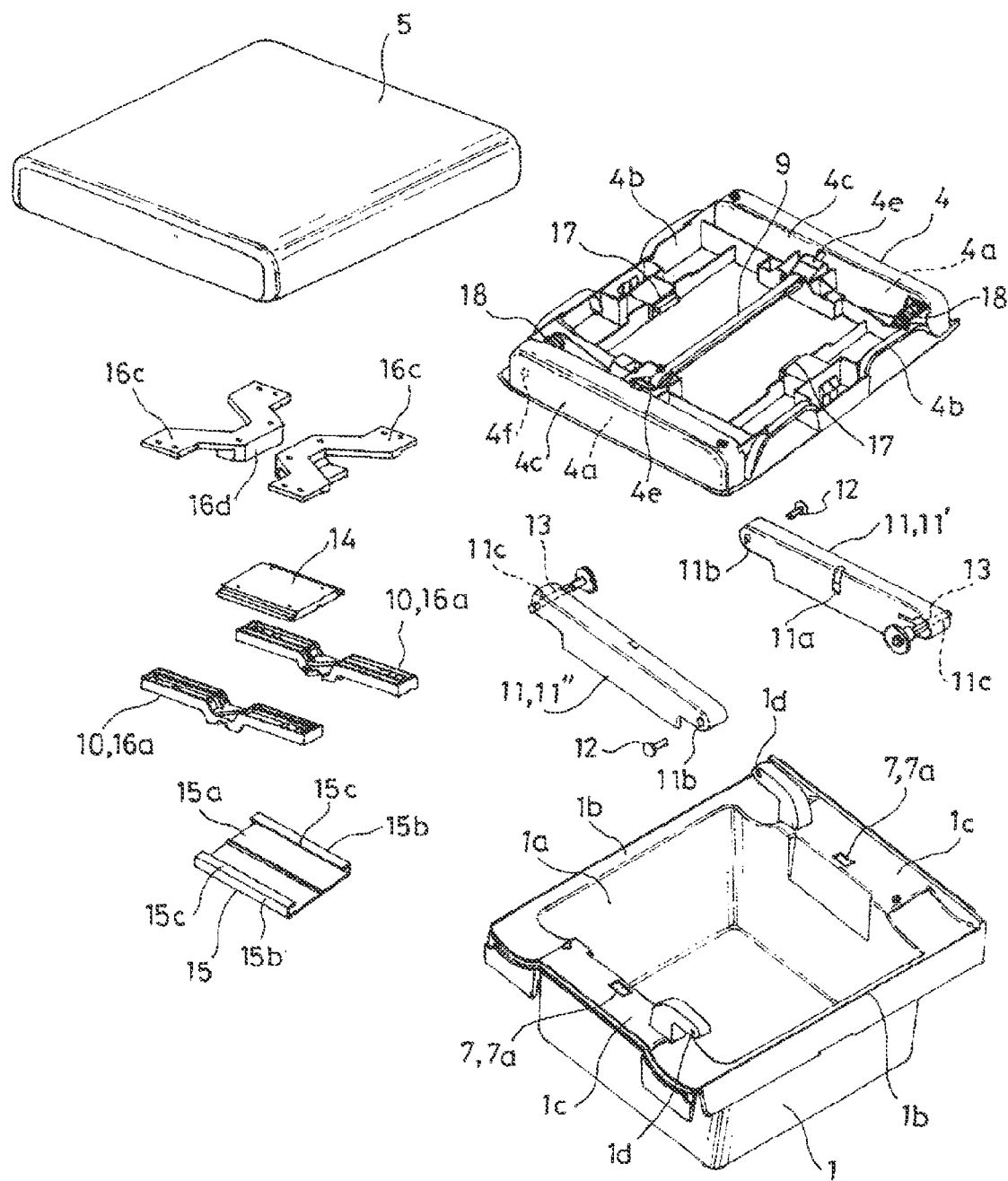
FIG. 1 is an exploded perspective view of a configuration of a lid device according to one embodiment of the present invention.
Figure 2:
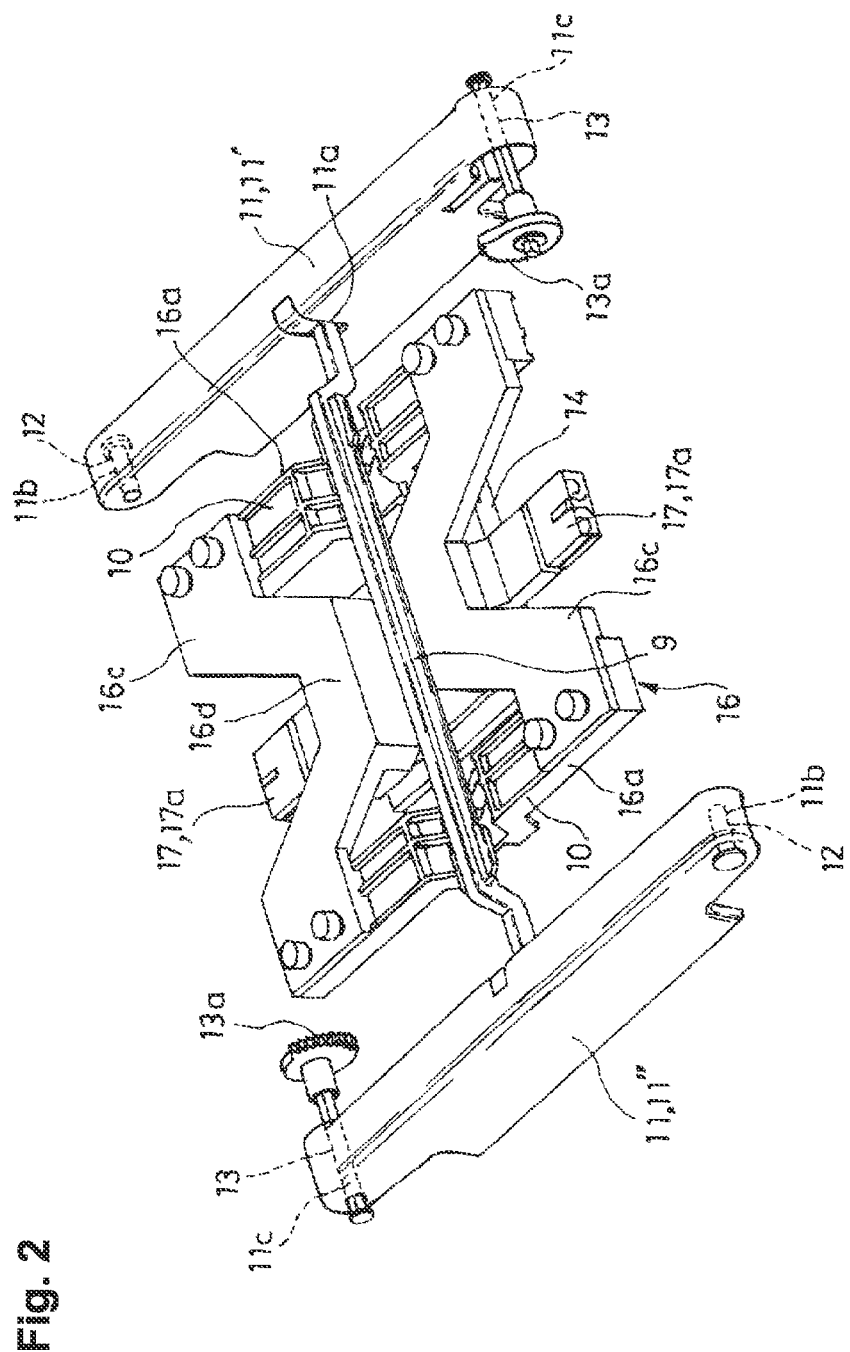
FIG. 2 is a perspective view of a configuration illustrating a switching member, a linking member, and a linking body forming the lid device, while omitting descriptions of an upper lid and a lower lid forming the lid device, where the switching member is in an intermediate position.

A typical embodiment of the present invention will be described below based on FIG. 1 through FIG. 13.

A lid device 2 according to the present embodiment includes a main part 3 formed of two lid forming bodies. In an example illustrated in the drawings, the main part 3 is formed of a lower lid 4 that forms one of the two lid forming bodies and an upper lid 5 that forms the other of the two lid forming bodies arranged on the lower lid 4.

The lower lid 4 is axially supported by an opening forming body 1 where an opening 1a is closed by the lid device 2.

Meanwhile, the upper lid 5 is combined with the lower lid 4 so as to be able to slide and move in a direction orthogonal to an axial direction x (see FIG. 4 and FIG. 7) of a rotating center shaft (first shaft 12 and second shaft 13 described later) of the lower lid 4.

That is, the main part 3 of the lid device 2 is formed of the upper lid 5 and the lower lid 4. The main part 3 is axially supported by the opening forming body 1 through the lower lid 4.

In an example illustrated in the drawings, the main part 3 and the opening forming body 1 form a storage body that forms a substantially hexahedral box. The opening forming body 1 opens an upper surface with the opening 1a forming an open area thereof. The main part 3 has a square disc shape. An upper surface 3a of the main part 3 is formed by the upper lid 5, and a lower surface 3b of the main part 3 is formed by the lower lid 4.

Figure 3:
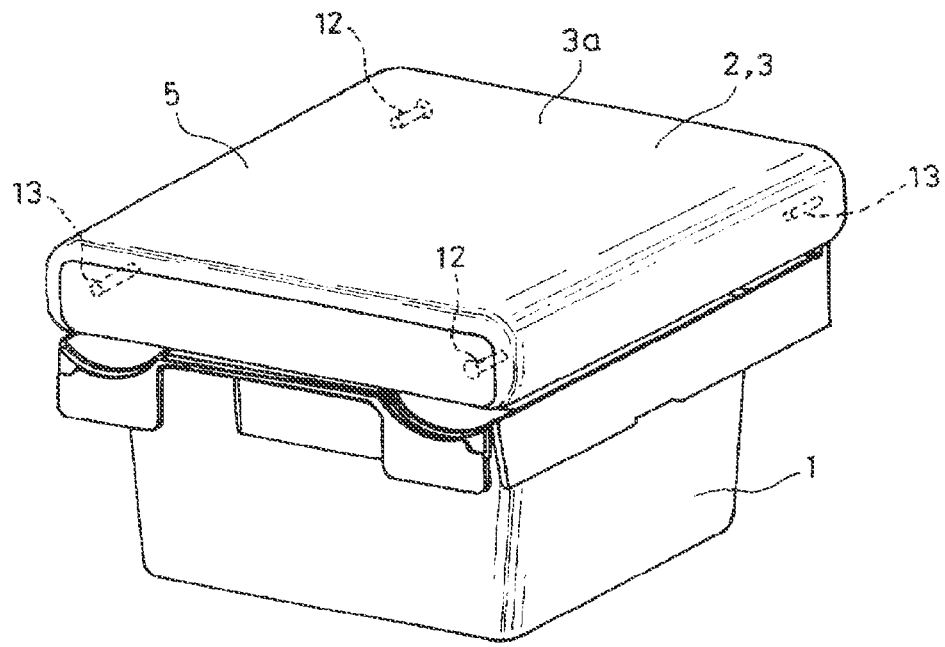
FIG. 3 is a perspective view of a configuration of the lid device and an opening forming body where an opening is closed by the lid device.
Figure 4:
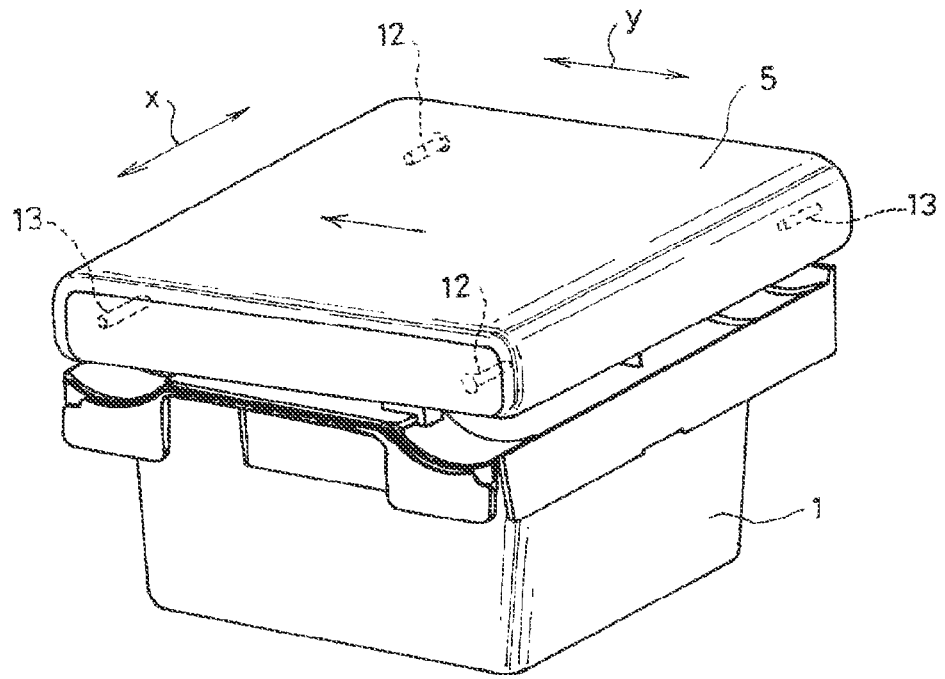
FIG. 4 is a perspective view of a configuration illustrating a state immediately after an upper lid has been slid and moved from the state in FIG. 3 toward the left side of FIG. 3.

In a state in which the lower surface 3b of the main body 3 abuts against an upper surface part around the opening 1a of the opening forming body 1, in an example illustrated in the drawings, the opening 1a of the opening forming body 1 is closed by the main body 3 in a state where the upper and lower surfaces 3a and 3b, respectively, of the main part 3 are positioned substantially horizontally (FIG. 3).

Meanwhile, the upper lid 5 is combined with the lower lid 4 so as to be able to slide and move in a substantially horizontal direction from the state described above where the opening 1a of the opening forming body 1 is closed.

Furthermore, the lower lid 4 includes a latch body 6 for a latch receiver 7 provided on the opening forming body 1,
- biasing means 8 that bias so that a latch end 6a of the latch body 6 is always in a position to engage the latch receiver 7, and
- a switching member 9 that is movably provided on the lower lid 4, and that, in a forward position, pushes the latch body 6 in a direction that opposes the bias, and thus disengages the engagement between the latch body 6 and the latch receiver 7.

At the same time, the lid device 2 includes a linking member 10 that links the upper lid 5 and the lower lid 4 so that when the upper lid 5 is moved toward the rotating center shaft (a first shaft 12 to be described later in an example illustrated in the drawings) side of the lower lid 4, the switching member 9 is moved to the forward position.

According to this configuration, first, by engaging the latch body 6 of the lower lid 4 with the latch receiver 7 of the opening forming body 1, the state where the opening 1a of the opening forming body 1 is closed is held by the lower lid 4 and the upper lid 5 (the main part 3) combined therewith. Second, by moving the upper lid 5 toward a rotating center shaft side of the lower lid 4 from a state where the opening 1a of the opening forming body 1 is closed in this way, the engagement of the latch body 6 is disengaged to allow the main part 3 to be rotated in a direction that opens the opening 1a of the opening forming body 1 with the rotating center shaft as a center. Since the main part 3 opens with a movement destination side of the upper lid 5 as a center of rotation from a side opposite this center of rotation, the upper lid 5 can be operated intuitively to achieve this opening operation. Third, by reactivating the main part 3 from the state where the opening 1a of the opening forming body 1 is opened, it is possible to recreate the state where the opening 1a of the opening forming body 1 is closed by the main body 3, and this state is held by reengaging the latch body 6 with the latch receiver 7.

According to the present embodiment, the lower lid 4 also includes a linking body 11. The linking body 11 is axially supported on one end by the opening forming body 1 where the opening 1a is closed by the lid device 2, that is, the main part 3, through a first shaft 12, and is axially supported on the other end by the lower lid 4 through a second shaft 13 parallel to the first shaft 12. Also, according to the present embodiment, the linking body 11 includes the latch body 6 for the latch receiver 7 provided on the opening forming body 1 and biasing means 8 that bias so that the latch end 6a of the latch body 6 is always in a position to engage the latch receiver 7.

Furthermore, according to the present embodiment, the switching member 9 provided on the lower lid 4 includes an engaging end 9a that fits into an engaging hole 11a formed in the linking body 11 between both ends of the linking body 11, the switching member being provided movably so as to be positioned in a forward position where the engaging end 9a fits furthest into the linking body 11 through the engaging hole 11a, a retracted position where the engaging end is pulled out from the engaging hole 11a, or an intermediate position between the forward and retracted positions, respectively.

Furthermore, the upper lid 5 is combined with the lower lid 4 so as to be able to slide and move in a direction orthogonal to an axial direction x of the first shaft 12 and the second shaft 13.

At the same time, the linking member 10 is configured to link the upper lid 5 and the lower lid 4 so that, when the upper lid 5 is in a position before moving, the switching member 9 is positioned in the intermediate position,
- when the upper lid 5 is moved to the first shaft 12 side, the switching member 9 is moved toward the forward position, and
- when the upper lid 5 is moved toward the second shaft 13 side, the switching member 9 is moved toward the retracted position.

In an example illustrated in the drawings, a male guiding member 14 fixed to a lower part of the upper lid 5 is combined with a female guiding member 15 fixed to an upper part of the lower lid 4, the upper lid 5 is slidably and movably combines with the lower lid 4.

In an example illustrated in the drawings, the upper lid 5 includes a frame body 16 formed from a pair of long linking bars 16a following a sliding movement direction y (see FIG. 4 and FIG. 7) of the upper lid 5, a frame forming body 16c erected between one end of each of the pair of linking bars 16a, and a frame forming body 16c erected between the other end of each of the pair of linking bars 16a.

The pair of linking bars 16a is arranged in the axial direction x with a gap therebetween. Each of the pair of frame forming bodies 16c has a mounting part 16d, between both ends thereof, extending horizontally toward a center of the frame body 16.

The male guiding member 14 has a plate shape that is positioned in the center of the frame body 16 by the mounting part 16d. The frame body 16 fixes an upper part of the frame forming body 16c to a lower center of the upper lid 5, thus integrating the male guiding member 14 and the upper lid 5.

Meanwhile, the female guiding member 15 includes a square base plate 15a that is fixed to a center of the upper part of the lower lid 4, and a rising part 15*b* that rises upward from a pair of sides on the base plate 15*a* following the sliding movement direction y. The male guiding member 14 is designed to fit between a pair of the rising parts 15*b* of the female guiding member 15, substantially gap free. A claw 15*c* is formed on an upper end of the rising part 15*b* protruding toward a center side of the frame body 16, by which the male guiding member 14 is held in a state of being accepted into the female guiding member 15.

In another example illustrated in the drawings, the pair of linking bars 16*a* functions as the linking member 10 with respect to the switching member 9, which will be described later, that is movably supported by the lower lid 4 facing toward the axial direction x.

In an example illustrated in the drawings, each of the pair of linking bars 16*a* is positioned below the switching member 9, which will be described later, in a position midway along a length direction of said bar, and a protrusion 9*b* protruding downward from a lower part of the switching member 9 fits into a long hole 16*b* formed in a position midway along the length direction of the linking bar 16*a*. A hole width of the long hole 16*b* is substantially equal to a diameter of the protrusion 9*b*. The long hole 16*b* is formed following a virtually straight line that intersects the sliding movement direction y of the upper lid 5 at an angle of substantially 45 degrees (see FIG. 7).

Figure 7:
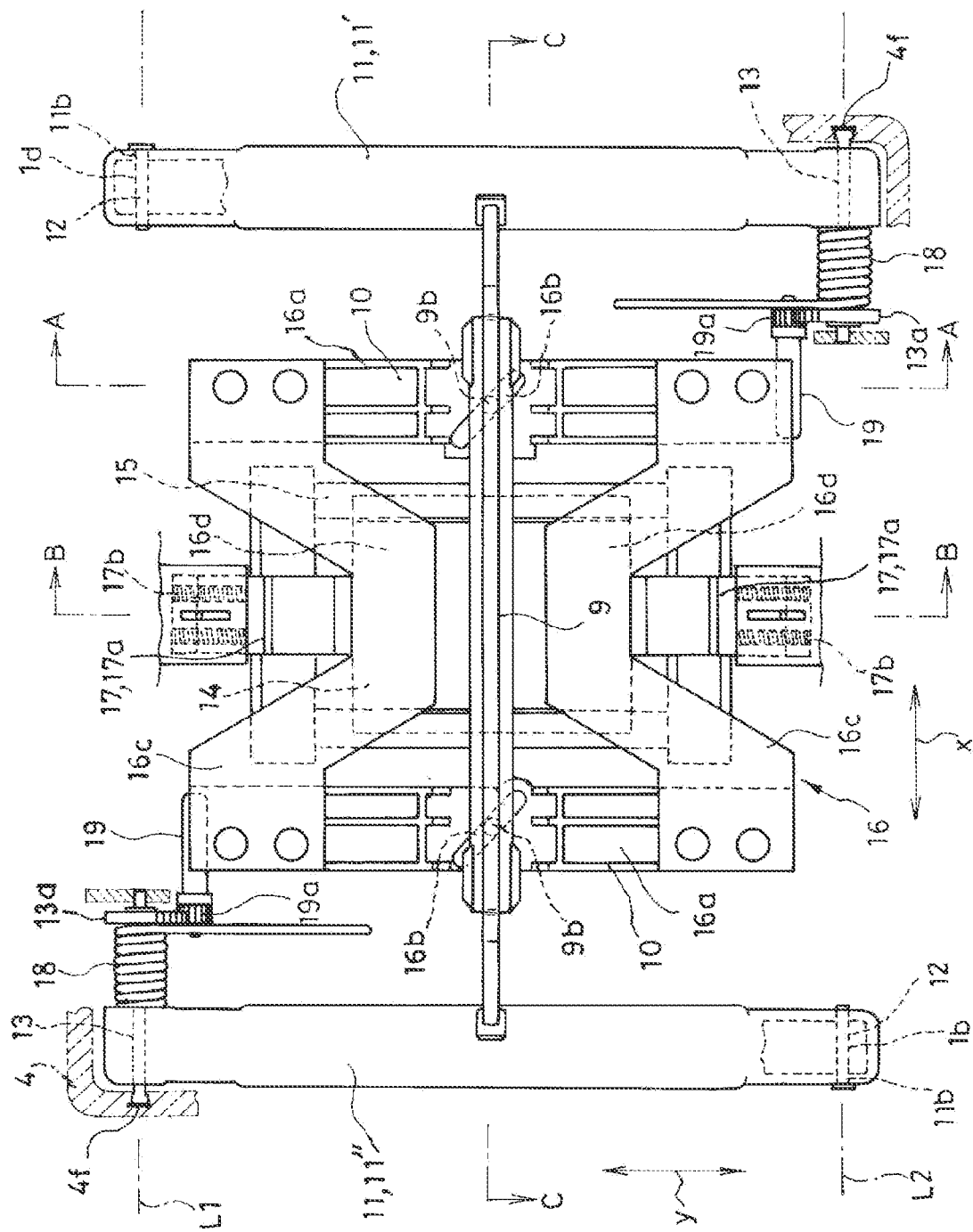
FIG. 7 is a plan view of a configuration illustrating a switching member, a linking member, and a linking body forming the lid device, while omitting descriptions of an upper lid and a lower lid forming the lid device, where the switching member is in an intermediate position.
Figure 8:
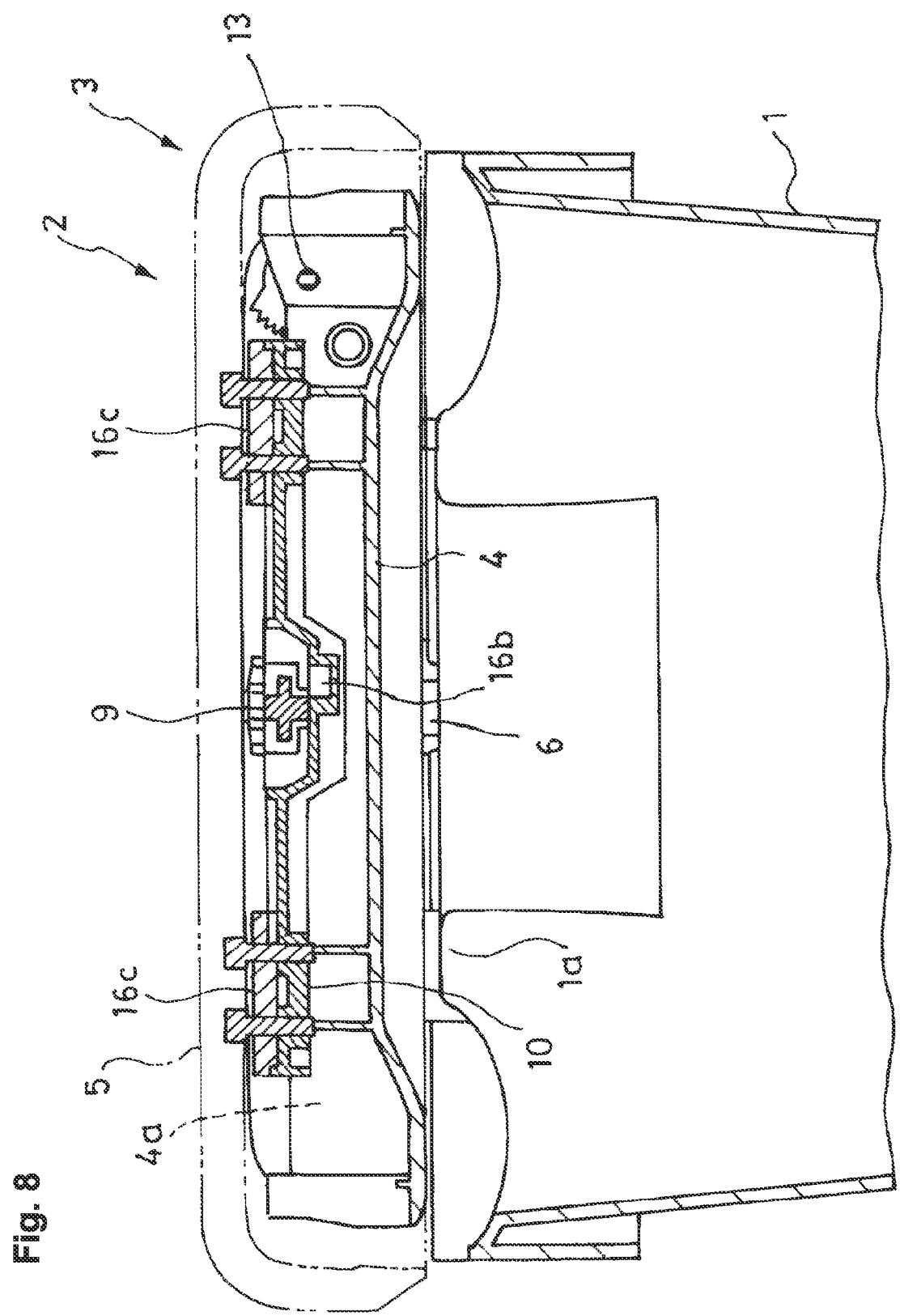
FIG. 8 is a cross-sectional view of a configuration of a position of a line A-A in FIG. 7.
Figure 9:
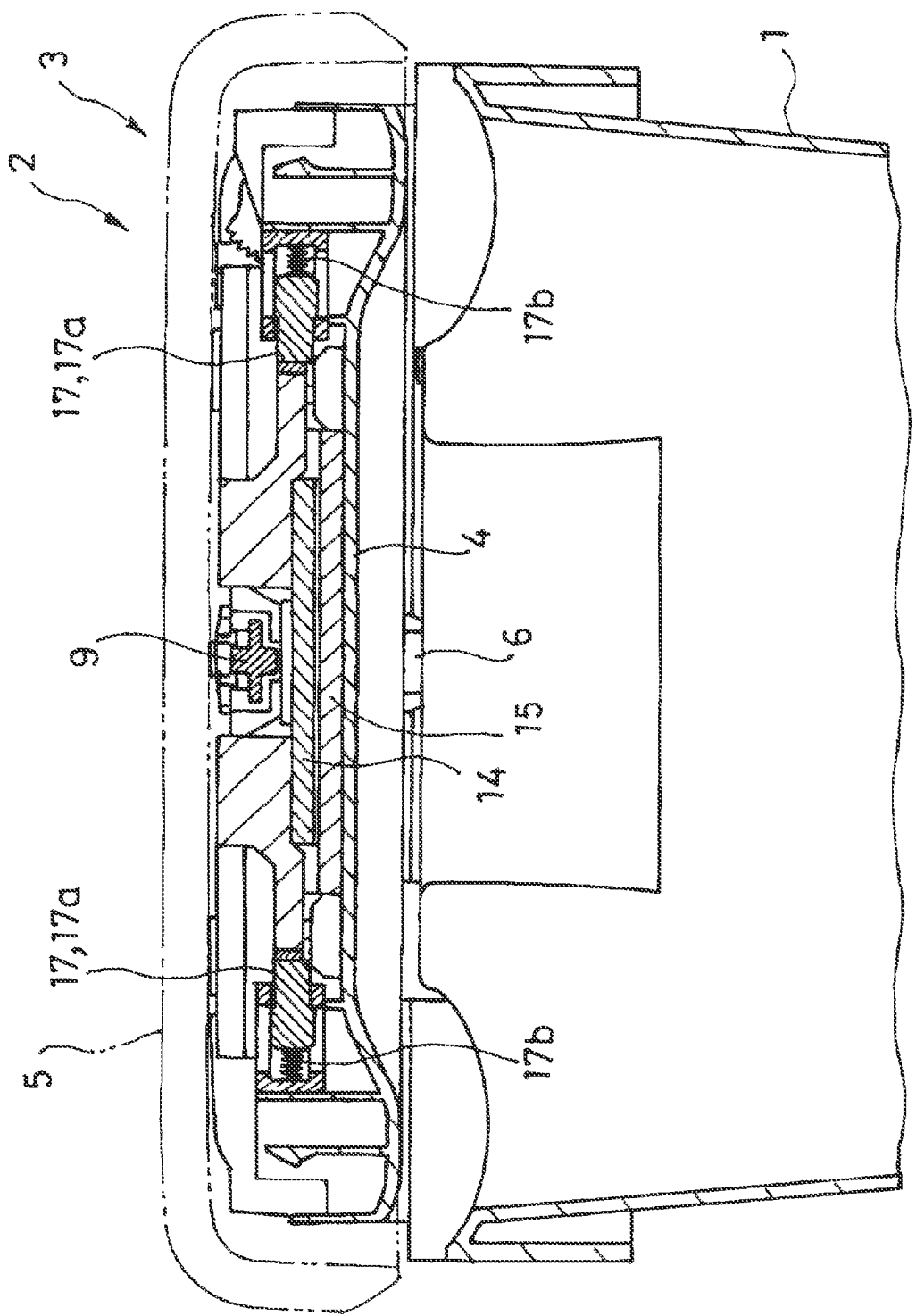
FIG. 9 is a cross-sectional view of a configuration at a position of line B-B in FIG. 7.

Furthermore, when the upper lid 5 is in the position before moving, the protrusion 9*b* is positioned approximately midway along a length direction of the long hole 16*b* (FIG. 7), and, at this time, the switching member 9 is positioned in the intermediate position (FIG. 7). Since, as will be described later, the latch body 6 provided on the linking body 11 and the latch receiver 7 provided on the opening forming body 1 are engaged, and the linking body 11 and the main part 3 are also integrated at this time at the position of the engaging hole 11*a*, the opening 1*a* of the opening forming body 1 is held closed by the main part 3 (FIG. 3 and FIG. 7 through FIG. 10).

Figure 11:
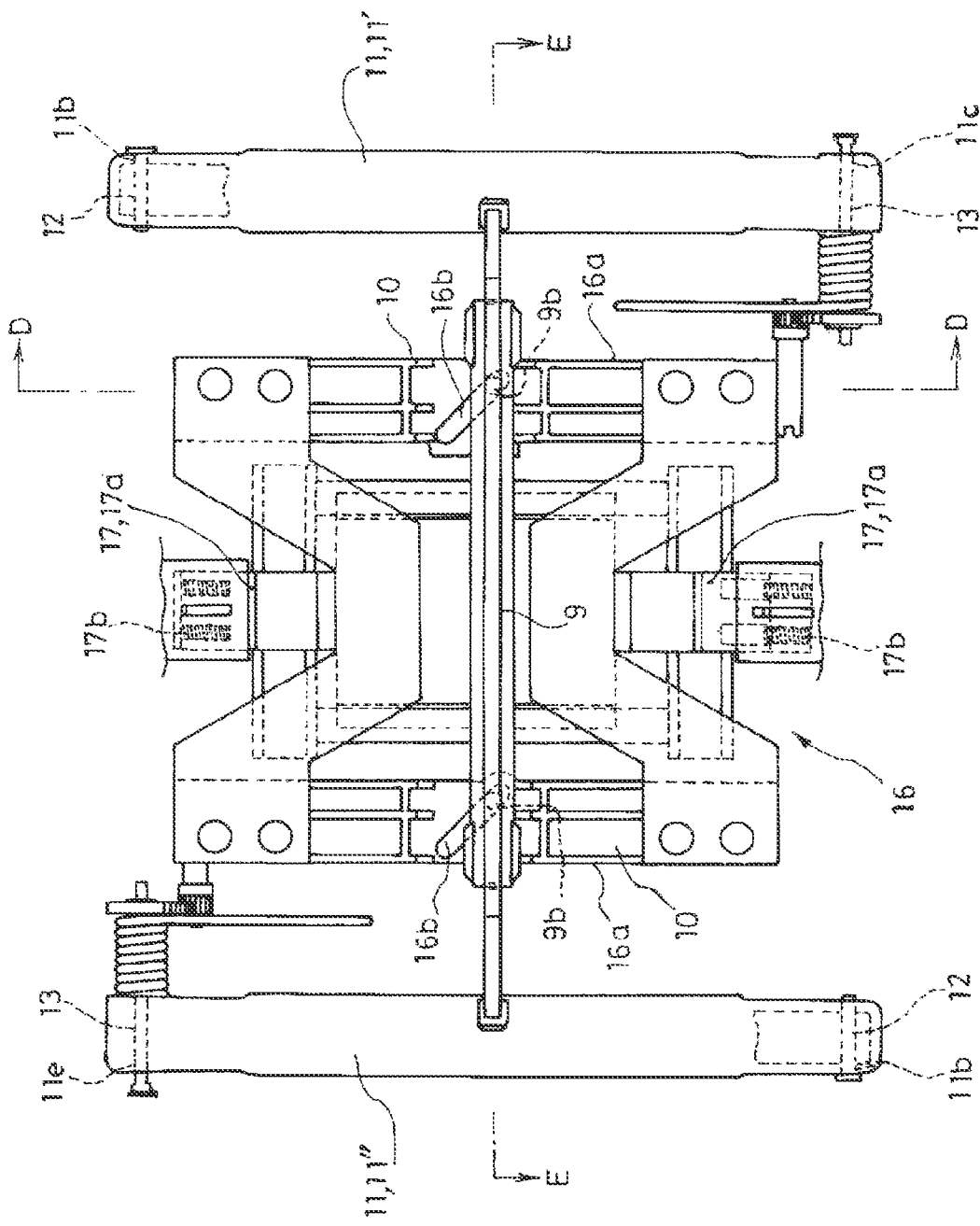
FIG. 11 is a plan view of a configuration illustrating a switching member, a linking member, and a linking body forming the lid device, while omitting descriptions of the state in FIG. 4 and the upper lid and the lower lid forming the lid device.
Figure 12:
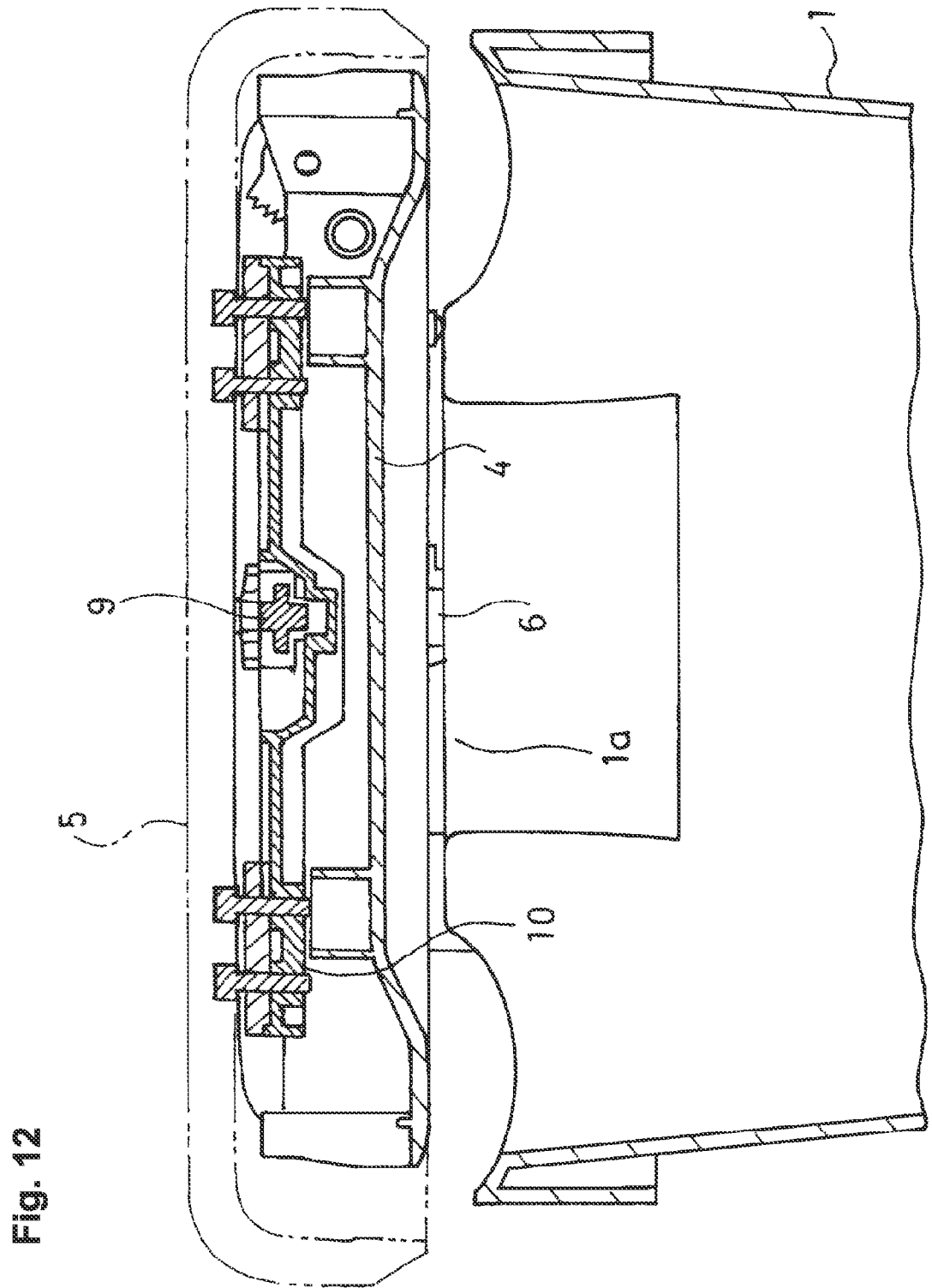
FIG. 12 is a cross-sectional view of a configuration at a position of line D-D in FIG. 11.
Figure 13:
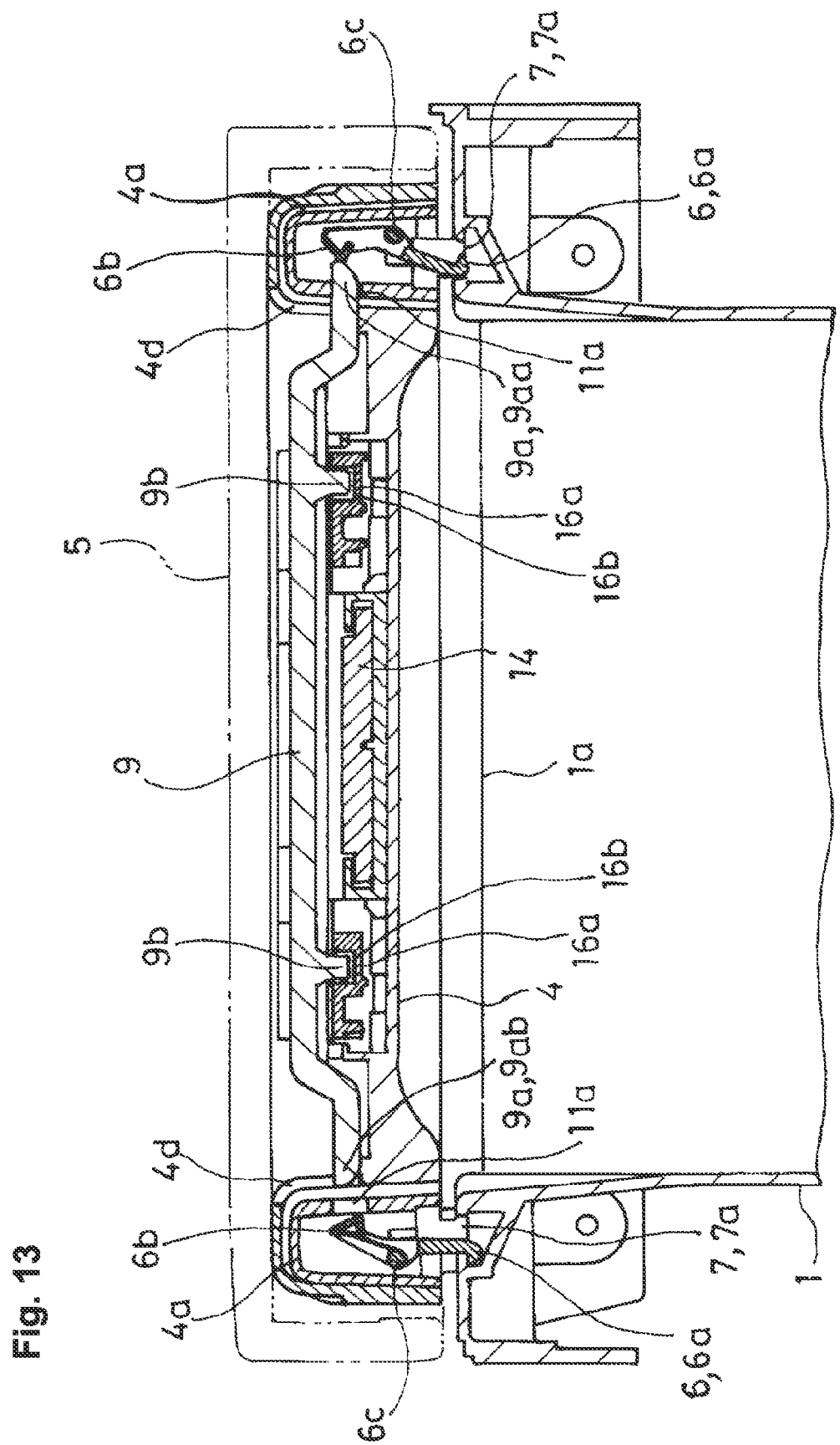
FIG. 13 is a cross-sectional view of a configuration at a position of line E-E in FIG. 12.

Next, when the upper lid 5 is moved to the first shaft 12 side (upper side of FIG. 11 with respect to the linking body 11 on the right side in FIG. 11), the protrusion 9*b* is moved to one end side of the long hole 16*b* and the switching member 9 is moved to the forward position on the right side in FIG. 11 (FIG. 11 and FIG. 13). Since, as will be described later, the engagement between the latch body 6 provided on the linking body 11 and the latch receiver 7 provided on the opening forming body 1 is disengaged at this time, the main part 3 can be moved forward in a direction that opens the opening 1*a* of the opening forming body 1 with the first shaft 12 in the center in a state where the linking body 11 and the main part 3 are integrated at the position of the engaging hole 11*a* (FIG. 4, FIG. 5, and FIG. 11 through FIG. 13).

Figure 6:
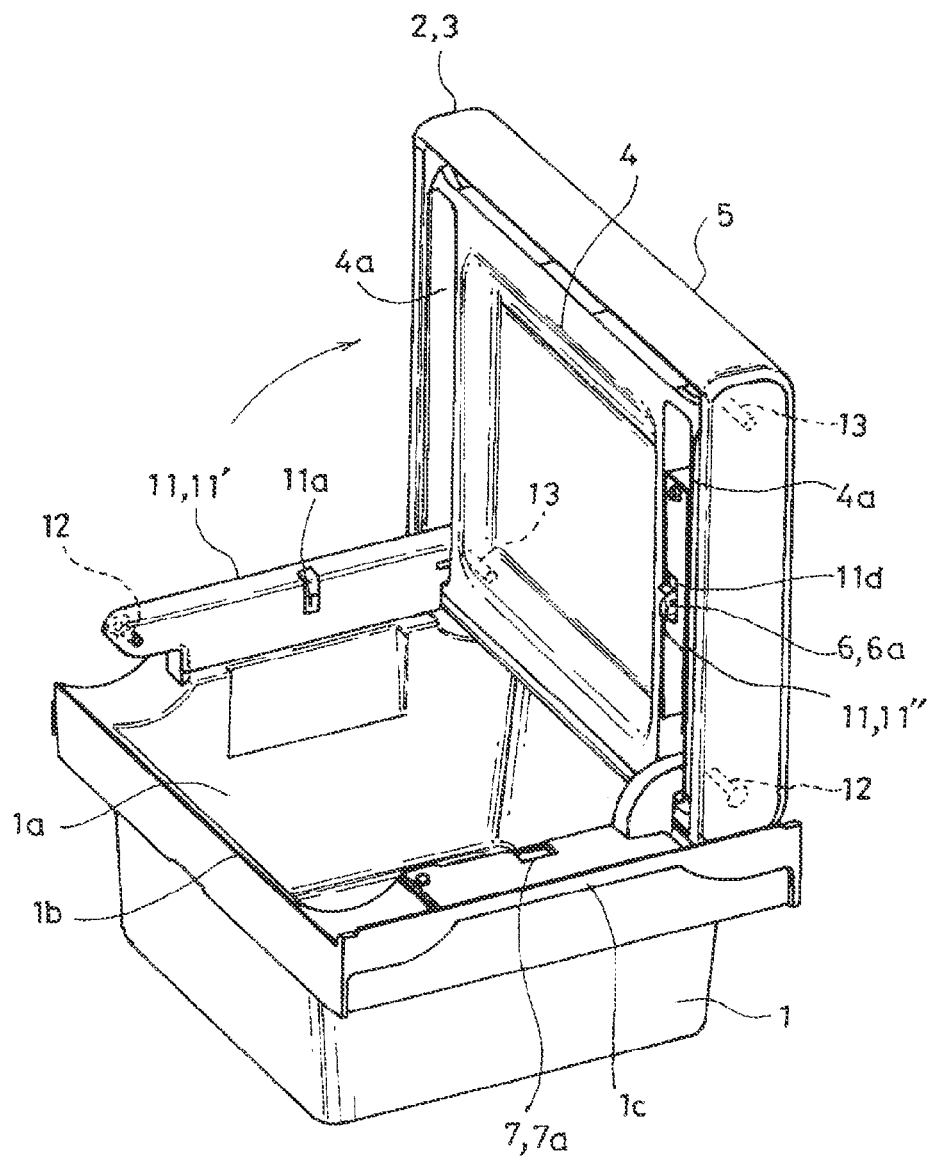
FIG. 6 is a perspective view of a configuration illustrating a state where the upper lid has been slid and moved in a direction opposite that in FIG. 4 from the state in FIG. 3 such that the upper lid has been rotated vertically and the opening in the opening forming body has been opened.

Opposite to this, when the upper lid 5 is moved to the second shaft 13 side (lower side of FIG. 11 with respect to the linking body 11 on the right side in FIG. 11), the protrusion 9*b* is moved to the other end side of the long hole 16*b* and the switching member 9 is moved to the retracted position on the right side in FIG. 11. Since, as will be described later, the main part 3 and the linking body 11 are separated at the position of the engaging hole 11*a* at this time in a state where the latch body 6 provided on the linking body 11 and the latch receiver 7 provided on the opening forming body 1 are engaged, the main part 3 can be moved forward in a direction that opens the opening 1*a* of the opening forming body 1 with the second shaft 13 in the center in a state where the linking body 11 is left on the opening forming body 1 side (FIG. 6).

In an example illustrated in the drawings, the switching member 9 forms a rod shape in the axial direction x, and is provided with the protrusion 9*b* in each of two locations in the axial direction x with a gap therebetween. Furthermore, one of the protrusions 9*b* on the switching member 9 fits in the long hole 16*b* of one of the pair of linking bars 16*a*, and the other of the protrusions 9*b* on the switching member 9 fits in the long hole 16*b* of the other of the pair of linking bars 16*a*.

Furthermore, according to the present embodiment, the lid device 2 includes upper lid biasing means 17 that reactively bias the upper lid 5 to the position before moving. In an example illustrated in the drawings, the upper lid biasing means 17 are provided in the lower lid 4. The upper lid biasing means 17 protrude toward a center side of the lower lid 4 through the action of a compression coil spring 17*b*, and are formed of a contacting body 17*a* that is caused to make contact with the mounting part 16*d* of the frame forming body 16*c* of the frame body 16. In an example illustrated in the drawings, the contacting body 17*a* is movably supported by the lower lid 4 in a direction orthogonal to the axial direction x. Furthermore, the frame body 16 is held sandwiched between the contacting body 17*a* that is caused to make contact with an outside of one of the mounting parts 16*d* of the pair of frame forming bodies 16*c* that configure the frame body 16 and the contacting body 17*a* that is caused to make contact with an outside of the other of the mounting parts 16*d* of the pair of frame forming bodies 16*c* that forms the frame body 16. When the upper lid 5 slides and moves, the contacting body 17*a* on a movement destination side retracts while compressing the spring 17*b* (FIG. 11). When the upper lid 5 stops sliding and moving, the retracted contacting body 17*a* advances toward an original position thereof, wherein advancement relocates the upper lid 5 to a position thereof before sliding and moving.

In another example illustrated in the drawings, the opening 1*a* of the opening forming body 1 is formed to have an approximately rectangular shape having width and length, and the main part 3 is also, with respect to this, made to form an approximately rectangular disc shape having width and length. The lid device 2 is designed so that the main part 3 that closes the opening 1*a* of the opening forming body 1 is able to be rotated and opened even with a side, of either an edge part facing the opening 1*a*, or, in an example illustrated in the drawings, of an edge part 1*b* on a length side following the axial direction x in the opening 1*a* as a center of rotation.

Any opening forming body 1 that forms the opening 1*a* to be closed that can be opened by the main part 3 becomes the opening forming body 1 to which the present invention can be applied. Typical examples of the opening forming body 1 include main units of storage bodies included in the interiors of vehicles such as automobiles and aircraft and main units of furniture, home appliances, or the like, that include storage units.

A specific example includes a case where the opening forming body 1 is a box with the opening 1*a* as an upper surface that forms an automobile center console box to which the present invention applies the main part 3 as a lid thereof. This lid closes the opening 1*a* of this box in an approximately horizontal state. Furthermore, according to an application of the present invention, the lid can be raised, rotated, and opened from a passenger seat side, and can also be raised, rotated, and opened from a driver seat side. Or, according to another application of the present invention, the lid can be raised, rotated, and opened from a rear seat side, and can also be raised, rotated, and opened from a front seat side. In the former case, the center console box is formed so that the axial direction x is arranged in a lengthwise direction of the automobile. In the latter case, the center console box is formed so that the axial direction x is arranged in a widthwise direction of the automobile.

That is, according to an application of the present invention, a center console box is formed of a box forming body as the opening forming body 1 and a lid device that is axially supported in this box forming body and holds a state where an opening of the box forming body is closed by a latch mechanism (the latch body 6 and the latch receiver 7), where the state held by the lid device through the latch mechanism is released by a moving operation (sliding and moving of the upper lid 5) with respect to the lid device.

In an example illustrated in the drawings, when the engaging end 9a of the switching member 9 is in the forward position, the latch body 6 is pushed by the engaging end 9a in a direction opposing the bias, which thus disengages the engagement of the latch body 6 with the latch receiver 7 (see the right side of FIG. 13). At this time, the main part 3 and the linking body 11 are joined in two places to the second shaft 13 and the engaging end 9a of the switching member 9, meanwhile, the linking body 11 and the opening forming body 1 are joined through the first shaft 12 only. Accordingly, at this time, the main part 3 can be rotated and opened with the first shaft 12 as the center in a state where the main part 3 and the linking body 11 are not separated. (This state is abbreviated below as the first shaft side rotating state.

When the engaging end 9a of the switching member 9 is in the intermediate position, the engaging end 9a engages with the engaging hole 11a of the linking body 11 in a state where the engagement between the latch body 6 and the latch receiver 7 is not disengaged. At this time, the main part 3 and the linking body 11 are joined in two places to the second shaft 13 and the engaging end 9a of the switching member 9, meanwhile, the linking body 11 and the opening forming body 1 are joined in two places to the first shaft 12 and to the latch body 6 and latch receiver 7. Accordingly, at this time, the main part 3 cannot be rotated and opened, even with the first shaft 12 as the center, or even with the second shaft 13 as the center, and the opening 1a of the opening forming body 1 is held closed by the main part 3. (This state is abbreviated below as the non-rotatable state.)

Meanwhile, when the engaging end 9a of the switching member 9 is in the retracted position, the engaging end 9a does not engage with the engaging hole 11a of the linking body 11 in a state where the engagement between the latch body 6 and the latch receiver 7 is not disengaged (see the left side of FIG. 13). At this time, the main part 3 and the linking body 11 are joined through the second shaft 13 only, meanwhile, the linking body 11 and the opening forming body 1 are joined in two places to the first shaft 12 and to the latch body 6 and the latch receiver 7. Accordingly, at this time, the main part 3 can be rotated and opened with the second shaft 13 as the center in a state where the linking body 11 and the opening forming body 1 are not separated. (This state is abbreviated below as the second shaft side rotating state.)

The main part 3 closed from a state of being opened is returned to a state where the opening 1a is closed again by, during the first shaft side rotating state, reengaging the latch body 6 with the latch receiver 7 of the opening forming body 1, or by, during the second shaft side rotating state, reengaging the engaging end 9a of the switching member 9 with the engaging hole 11a of the linking body 11 left on the opening forming body 1 side.

When these relationships are shown using symbols to make the relationships easier to understand, the relationships are shown below. (Note that, below, + sign is used to mean that the parts to the left and right of the sign are integrated by being joined at two places while/sign is used to mean that the parts to the left and right of the sign are joined at only one place.)

"First shaft side rotating state"→main part 3+linking body 11/opening forming body 1

"Non-rotatable state"→main part 3+linking body 11+opening forming body 1

"Second shaft side rotating state"→main part 3/linking body 11+opening forming body 1

Since the first shaft 12 of the linking body 11 is on one end side thereof and the second shaft 13 of the linking body 11 is on the other end side thereof, in the first shaft side rotating state, the main part 3 opens so that a side where the second shaft 13 is positioned is a free end. Meanwhile, in the second shaft side rotating state, the main part 3 opens so that a side where the first shaft 12 is positioned is a free end. That is, the main part 3 opens both ways.

Here, according to the present embodiment, the main part 3 is held on both sides. That is, the linking body 11 is formed of a first linking body 11' and a second linking body 11" and the main part 3 is assembled with the opening forming body 1 through these two linking bodies 11' and 11". In an example illustrated in the drawings, in the opening 1a, the first linking body 11' having length is aligned on a side of one edge part 1c on a width side along the edge part 1c on said width side, and the second linking body 11" having length is aligned on a side of the other edge part 1c on a width side along the edge part 1c on said width side.

Furthermore, the main part 3 is assembled to the opening forming body 1 through the first linking body 11' in one side part 3c on a width side of the main part 3, and the main part 3 is assembled to the opening forming body 1 through the second linking body 11" in the other side part 3c on a width side of the main part 3.

Furthermore, at the same time, as is illustrated in FIG. 7 in particular, the second shaft 13 of the second linking body 11" is positioned approximately on a virtual straight line L1 that passes through the first shaft 12 of the first linking body 11', and the first shaft 12 of the second linking body 11" is positioned approximately on a virtual straight line L2 that passes through the second shaft 13 of the first linking body 11'.

Furthermore, the switching member 9 includes a first engaging end 9aa for the first linking body 11' and a second engaging end 9ab for the second linking body 11", where when the first engaging end 9aa of the switching member 9 is moved to the forward position, the second engaging end 9ab is moved to the retracted position, and when the second engaging end 9ab of the switching member 9 is moved to the forward position, the first engaging end 9aa is moved to the retracted position.

Figure 5:
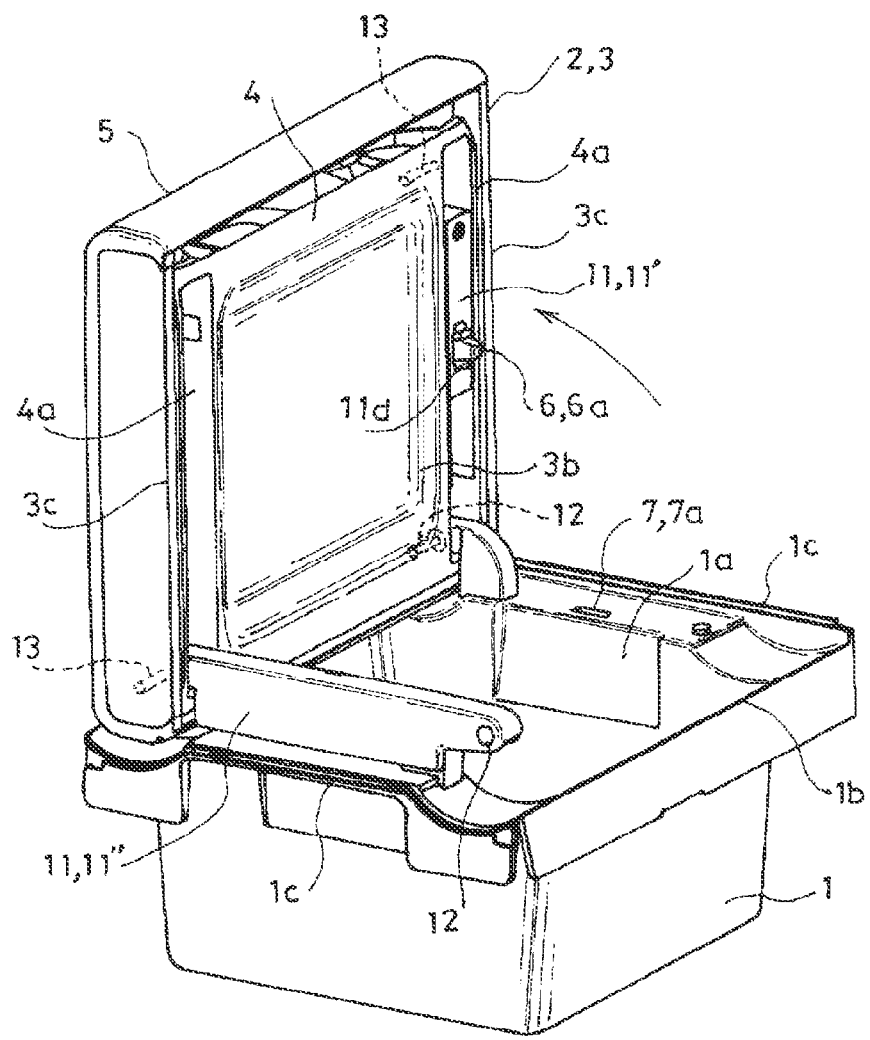
FIG. 5 is a perspective view of a configuration illustrating a state where the upper lid has been rotated vertically from the state in FIG. 4, and an opening of the opening forming body has been opened.

When the first engaging end 9aa of the switching member 9 is moved to the forward position, the side part 3c on a width side of the main part 3 on one side is placed into the first shaft side rotating state. In response to this, the side part 3c on a width side of the main part 3 on the other side is placed into the second shaft side rotating state. Here, since the second shaft 13 of the second linking body 11" is positioned approximately on the virtual straight line L1 that passes through the first shaft 12 of the first linking body 11', it is possible to rotate and open the main part 3. (FIG. 5 and FIG. 13)

When the second engaging end 9ab of the switching member 9 is moved to the forward position, the side part 3c on a width side of the main part 3 on the other side is placed into the first shaft side rotating state. In response to this, the side part 3c on a width side of the main part 3 on the one side is placed into the second shaft side rotating state. Here, since the first shaft 12 of the second linking body 11" is positioned approximately on the virtual straight line L2 that passes through the second shaft 13 of the first linking body 11', it is possible to rotate and open the main part 3 with the opposite side to the former case as a free end. (FIG. 6)

When neither the first engaging end 9aa nor the second engaging end 9ab of the switching member 9 is in the forward position, both the first engaging end 9aa and the second engaging end 9ab are in the intermediate position. At this time, since the side part 3c on a width side of the main part 3 on the one side and on the other side are in the non-rotatable state, the opening 1a of the opening forming body 1 is held closed by the main part 3. (FIG. 3 and FIG. 7)

When the main part 3 is held by both sides in this way, the main part 3 can be rotated and opened in a particularly stable manner.

Furthermore, according to the present embodiment, the main part 3 is constantly biased toward opening and rotating direction with respect to the second shaft 13 as a center by a torsion coil spring 18 wound around the second shaft 13 of the first linking body 11' and the second shaft 13 of the second linking body 11".

Thus, according to the present embodiment, the main part 3 can be rotated and opened by the biasing of the spring 18.

In particular, according to the present embodiment, the main part 3 can be made to rotate and open through the biasing of the spring 18, regardless of the direction from which the main part is opened.

Furthermore, according to the present embodiment, a pinion 19a that meshes with a gear 13a provided on the second shaft 13 and a damper device 19 that applies braking to a rotation of the pinion 19a are provided on the side of the second shaft 13 in the lower lid 4 that forms the main part 3.

Thus, according to the present embodiment, the rotation and opening of the main part 3 by the spring 18 are slowed, thus making it possible to give a sense of luxury to the lid device 2 or to an article, device, fixture, or the like, to which the device is applied.

Furthermore, a storage recess 4a for the linking body 11 opened in a lower part of the lower lid 4 is formed in each of the side parts 3c on a width side in two places on the main part 3 across a width direction of the lower lid 4 in the lower lid 4.

A raised wall 4b is formed in the lower lid 4 between the storage recess 4a on an upper surface side to be closed by the upper lid 5 on each edge part along a length direction of the lower lid, and thus a side wall 4c that outlines the storage recess 4a and the raised wall 4b give the main part 3 a box shape with an upper surface opening (see FIG. 1). A through part 4d for the engaging end 9a of the switching member 9 that penetrates the side wall 4c is provided approximately in the center of the side wall 4c of the storage recess 4a provided inside the main part 3 (see FIG. 10). In FIG. 1, symbol 4e is a holding member for the switching member 9 that has introduced the engaging end 9a into the through part 4d (note that the holding member 4e has been omitted from all drawings except FIG. 1).

In an example illustrated in the drawings, the switching member 9 forms a rod shape having length, an end part of which is always allowed to go into both the through part 4d formed in one of the storage recesses 4a and the through part 4d formed in the other storage recess 4a. This end part is made to function as the engaging end 9a.

When the upper lid 5 is in the position before moving, the protrusion 9b is positioned approximately midway along the length direction of the long hole 16b. (FIG. 7)

When the upper lid 5 is slid and moved from the position before moving toward the upper side in FIG. 7, the switching member 9 is moved to the right side in FIG. 7, and an upper end part 6b on an opposite side from the latch end 6a that sandwiches a rotating shaft 6c in the latch body 6 provided in the first linking body 11' on the right side is pushed in a direction that disengages the engagement with the latch receiver 7 (FIG. 13). Meanwhile, although omitted from the drawings, when the upper lid 5 is pushed in from the position before moving toward the lower side in FIG. 7, the switching member 9 is moved to the left side in the same drawing, and the upper end part 6b on an opposite side from the latch end 6a that sandwiches the rotating shaft 6c in the latch body 6 provided in the second linking body 11" on the left side is pushed in a direction that disengages the engagement with the latch receiver 7.

Figure 10:
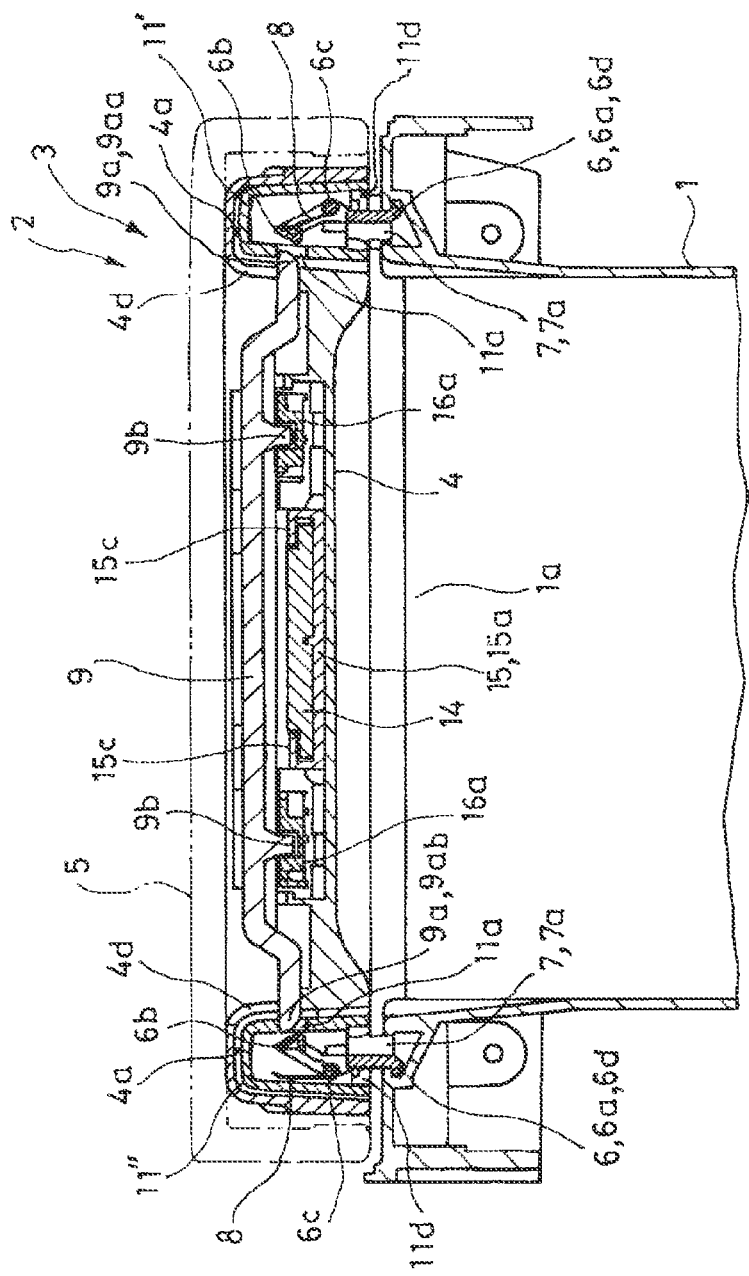
FIG. 10 is a cross-sectional view of a configuration at a position of line C-C in FIG. 7.

When the upper lid 5 is in the position before moving, both of the engaging ends 9a of the switching member 9 partly enter the engaging hole 11a of the linking body 11 inside the storage recess 4a through the through part 4d. (FIG. 10)

The linking body 11 includes a shaft hole 11b for the first shaft 12 on one end and a shaft hole 11c for the second shaft 13 on the other end, and forms a rod shape with a girth that allows the body to completely fit inside the storage recess 4a in a state where the main part 3 is closed.

The first shaft 12 passes through a shaft hole of a shaft receiving part that protrudes upward from an edge part of the opening 1a of the opening forming body 1 illustrated using symbol 1d in FIG. 1 and the shaft hole 11b for the first shaft 12 in the linking body 11.

The second shaft 13 passes through a shaft hole 4f (see FIG. 1) formed on an outer wall of the storage recess 4a of the lower lid 4 and the shaft hole 11c for the second shaft 13 of the linking body 11, and includes the gear 13a on a shaft end positioned inside the lower lid 4.

At the time of storage into the storage recess 4a, which is in a position approximately midway along a length direction of the linking body 11, the engaging hole 11a is provided in a state of penetrating an inner side wall toward a center side of the lower lid 4. Since the engaging end 9a of the switching member 9 is positioned in the intermediate position by the upper lid 5 that is relocated to the position before moving by the biasing of the upper lid biasing means 17 when the main part 3 is closed from a state of being open, the engaging end 9a is made to touch an outer surface of the linking body 11 and partially retracted, which thus allows movement toward a main part 3 closing position. In the main part 3 closing position, the engaging end 9a of the switching member 9 is once again restored to the intermediate position through the biasing of the upper lid biasing means 17, and made to enter and engage with the engaging hole 11a of the linking body 11.

In an example illustrated in the drawings, the latch receiver 7 is formed of a through hole 7a formed in an upper surface part 14 that forms the opening forming body 1 in a position approximately in the middle of said part, which is a side of the edge part 1c on a width side of the opening 1a of the opening forming body 1.

Meanwhile, the latch body 6 includes the latch end 6a that protrudes from a window hole 11d formed in a state penetrating through a lower part of the linking body 11 in a position approximately midway along the length direction of the linking body 11 and the upper end part 6b positioned in front of the engaging hole 11a that is on an interior of the linking body 11, and is rotatably supported in the linking body 11 by the rotating shaft 6c between the latch end 6a and the upper end part 6b in a direction along a rotating center shaft in the length direction of the linking body 11. The latch end 6a is formed of a claw body 6d that protrudes from an outer wall side of the linking body 11. Furthermore, a torsion coil spring is wound around the rotating shaft 6c as the biasing means 8, and this spring positions the latch body 6 in a position where the body causes the latch end 6a to enter the through hole 7a acting as the latch receiver 7 in the main part 3 closing state, and the claw body 6d to engage with a hole edge part inside the through hole 7a. When the engaging end 9a of the switching member 9 is moved to the forward position with the main part 3 in a closed state, the engaging end 9a pushes the upper end part 6b of the latch body 6, and the latch body 6 is rotated in a direction that disengages the engagement of the latch end 6a of said body with the through hole 7a acting as the latch receiver 7. This opens the main part 3 on this side with the first shaft 12 as the center in a state where the linking body 11 is stored in the storage recess 4a of the main part 3. (The linking body 11 on the opposite side to this linking body 11 is retained on the opening forming body 1 in a state where the latch body 6 is engaged with the latch receiver 7.) Since the engaging end 9a will return to the intermediate position if the sliding and moving operation of the upper lid 5 is stopped, the latch end 6a of the latch body 6 in the linking body 11 being lifted together with the main part 3 will be returned to an original position by the spring acting as the biasing means 8. When the main part 3 is closed, the latch end 6a abuts the hole edge part of the through hole 7a acting as the latch receiver 7, partially rotates and enters the through hole 7a against the biasing of the spring acting as the biasing means 8, returns to an original position in an entered position, and is engaged with the through hole 7a as described above.

Note that the present invention is naturally not limited to the embodiments described above, and thus may include any embodiment so long as the object of the present invention can be achieved.

BRIEF DESCRIPTION OF THE REFERENCE NUMERALS x Axial direction
1 Opening forming body
4 Lower lid
5 Upper lid
6 Latch body
7 Latch receiver
8 Biasing means
9 Switching member
10 Linking member Incidentally, the entire contents of the specification, scope of patent claims, drawings, and abstract of Japanese Patent Application No. 2020-017343 filed on Feb. 4, 2020 are cited herein, and are incorporated as the disclosure of the specification of the present invention.

What is claimed is:

1. A lid device comprising:
a main part having two lid forming bodies, wherein one of the two lid forming bodies is axially supported around a rotating center shaft of the one of the two lid forming bodies by an opening forming body where an opening is closed by the lid device, and includes:
a latch body for a latch receiver provided on the opening forming body;
a biasing means that biases the latch body so that a latch end of the latch body is always in a position to engage the latch receiver; and
a switching member that is movably provided on the one of the two lid forming bodies, and in a forward position, pushes the latch body in a direction that opposes a bias to disengage engagement between the latch body and the latch receiver, and
wherein another of the two lid forming bodies is combined to the one of the two lid forming bodies slidably and movably in a direction orthogonal to an axial direction of the rotating center shaft of the one of the two lid forming bodies, and includes:
a linking member that links the two lid forming bodies so that when the another of the two lid forming bodies is slid and moved toward the rotating center shaft side of the one of the two lid forming bodies, the switching member is moved to the forward position.

2. A center console box comprising:
the lower lid combined with the upper lid in the lid device according to claim 1 as a lid; and an opening forming body as a box,
wherein the center console box is arranged so that a rotating center shaft of the lower lid follows a lengthwise or widthwise direction of a vehicle.

3. A lid device comprising:
a lower lid; and
an upper lid arranged on the lower lid, wherein
the lower lid is axially supported by an opening forming body where an opening is closed by the lid device, and includes:
a latch body for a latch receiver provided on the opening forming body;
a biasing means that biases the latch body so that a latch end of the latch body is always in a position to engage the latch receiver; and
a switching member that is movably provided on the lower lid, and in a forward position, pushes the latch body in a direction that opposes a bias to disengages engagement between the latch body and the latch receiver, and
the upper lid is combined with the lower lid so as to be able to slide and move in a direction orthogonal to an axial direction of a rotating center shaft of the lower lid, and includes:
a linking member that links the upper lid and the lower lid so that when the upper lid is moved toward the rotating center shaft side of the lower lid, the switching member is moved to the forward position.

4. A lid device comprising:
a lower lid having a linking body; and
an upper lid arranged on the lower lid, wherein,
the linking body of the lower lid is axially supported on one end by an opening forming body where an opening is closed by the lid device through a first shaft and is axially supported on another end by the lower lid through a second shaft parallel to the first shaft, and includes a latch body for a latch receiver provided on the opening forming body and a biasing means that biases a latch end of the latch body to be always in a position to engage the latch receiver, and the lower lid includes an engaging end that fits into an engaging hole formed in the linking body between both ends of the linking body; and a switching member provided movably so as to be able to position the engaging end in a forward position where the engaging end fits furthest into the linking body through the engaging hole, a retracted position where the engaging end is pulled out from the engaging hole, or an intermediate position where the engaging end is between the forward and retracted positions, respectively, wherein when the engaging end of the switching member is in the forward position, the latch body is pushed by the engaging end in a direction opposing bias, which thus disengages the engagement of the latch body with the latch receiver, the upper lid is combined with the lower lid so as to be able to slide and move in a direction orthogonal to an axial direction of the first shaft and the second shaft, and the upper lid includes:

a linking member that links the upper lid and the lower lid, so that when the upper lid is in a position before moving, the switching member is positioned in the intermediate position, when the upper lid is moved to the first shaft side, the switching member is moved toward the forward position, and when the upper lid is moved toward the second shaft side, the switching member is moved toward the retracted position.

5. The lid device according to claim 4, further comprising an upper lid biasing means that reactively biases the upper lid toward the position before moving.

* * * * *